May 17, 1949.  M. P. GRAHAM  2,470,215
SWIVEL JOINT
Filed April 12, 1946

Inventor
MATTHEW P. GRAHAM.
by Attys.

Patented May 17, 1949

2,470,215

UNITED STATES PATENT OFFICE 2,470,215

SWIVEL JOINT

Matthew P. Graham, Detroit, Mich., assignor to Thompson Products, Inc., Cleveland, Ohio, a corporation of Ohio Application April 12, 1946, Serial No. 661,655

5 Claims. (Cl. 287—91)

This invention relates to a joint assembly adapted to be suspended from a support such as a mounting bracket and coacts therewith to form a lubricant reservoir for the joint parts. Specifically the invention deals with a swivel joint assembly for the idler arm of a cross link in a parallelogram steering linkage.

While the invention will hereinafter be specifically described as embodied in an idler arm swivel joint assembly, it should be understood that the principles of the invention are generally applicable to swivel joints and the invention is therefore not limited to the disclosed preferred usage.

According to this invention a bracket is mounted on a side frame beam of an automobile chassis to provide a mounting ledge. The ledge is apertured and receives the threaded end of a stud therethrough. A nut is tightened on this threaded end of a stud to clamp the stud to the bracket. The stud has a frusto conical head portion receiving the eye end of an idler arm therearound. This idler arm has an upstanding flange around the eye end thereof in spaced relation beneath the ledge of the bracket. A rubber seal ring is disposed on the eye end of the arm within the flange. The seal ring projects above the top of the flange to sealingly engage the ledge of the bracket. A coil spring is interposed between the ledge of the bracket and the arm to urge the arm toward the large end of the stud head for maintaining the arm and stud in bearing engagement. This spring also engages the base of the rubber ring to lock the ring against the flange of the arm. A sealed reservoir is thereby provided between the arm and ledge of the bracket.

The head of the stud carries a grease fitting communicating with a transverse grease hole that conveys grease to a peripheral groove around the stud head. The peripheral groove feeds grease to longitudinal grooves in the eye of the arm. These grooves are broached into the arm and do not extend to the bottom thereof. The upper ends of the grooves communicate with the grease reservoir. The assembly is thereby readily greased through the fitting projecting from the stud head and all wearing surfaces are easily flushed with grease. The assembly is readily installed, is inexpensive, and has a long wear life for swivelly mounting an idler arm or the like.

It is then an object of this invention to provide a joint assembly which coacts with a mounting support for forming a grease reservoir to receive and store lubricant for lubricating the bearing surfaces of the joint.

Another object of the invention is to provide a swivel joint for an idler arm or the like wherein wearing surfaces of the joint are maintained in constant engagement by a spring which is interposed between the arm portion of the joint and a mounting bracket for the arm.

A still further object of the invention is to provide a swivel joint construction for the idler arm of a parallelogram type steering linkage wherein a frusto conical stud head accurately centers the idler arm for swinging movement and supplies lubricant to the wearing surfaces of the joint.

A still further object of the invention is to provide a seal arrangement for a swivel joint wherein a housing member for the joint carries a ring against a mounting member for the joint and coacts with the mounting member to provide a lubricant reservoir.

A further object of the invention is to provide a lubricated swivel joint with a stud carrying a lubricant fitting and supplying grease to the wearing surfaces of the joint without permitting the grease to leak out of the joint.

Other and further objects of the invention will be apparent to those skilled in the art from the following detailed description of the annexed sheet of the drawings which, by way of preferred example only illustrates one embodiment of the invention.

Figure 1:
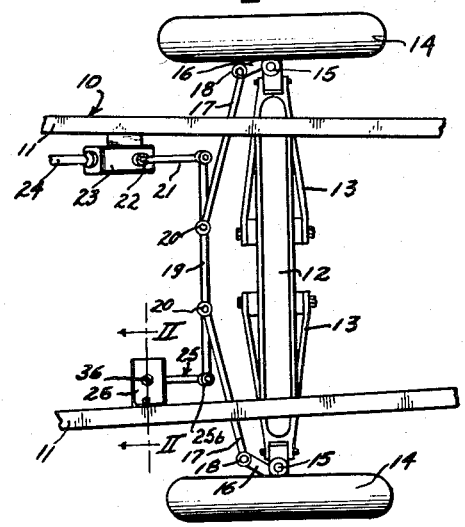
Figure 1 is a fragmentary top plan view of an automobile chassis having a parallelogram type steering linkage equipped with an idler arm according to this invention.
Figure 4:
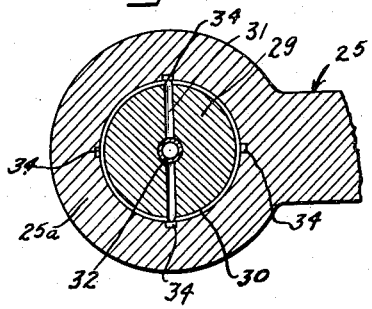
Figure 4 is a transverse cross sectional view taken along the line IV—IV of Fig. 2.
Figure 2:
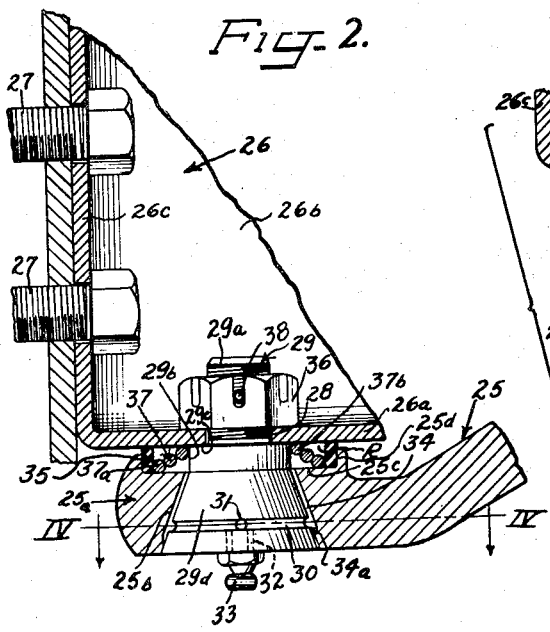
Figure 2 is an enlarged vertical cross sectional view taken along the line II—II of Fig. 1.

In Fig. 1 the reference numeral 10 designates generally an automobile chassis having side beams 11, 11 and a transverse beam 12. Wheel arms 13, 13 are pivoted on the transverse beam 12 and support the front wheels 14, 14 of the automobile. These wheels are rotated on sub-axles (not shown) pivoted on kingpins 15, 15. Steering arms 16, 16 extend rearwardly from the sub-axle assemblies. Tie rods 17, 17 are connected to the steering arms 16, 16 through ball and socket type joints 18, 18. The tie rods 17, 17 extend inwardly to the cross link 19 of a parallelogram type steering linkage, and are connected thereto by means of ball and socket type joints 26, 20. One end of the cross link 19 is pivoted to a pitman arm 21 suspended on the rock shaft 22 of a steering column gear box 23 carried on a side frame beam 11. The steering column 24 rotates the rockshaft 22 to swing the pitman arm and thereby longitudinally shift the cross link for swinging the wheels 14 about their kingpins 15 to thereby steer the automobile.

The other end of the cross link 19 is connected to an idler arm 25. This idler arm must be, and is, according to this invention, accurately swivelly mounted around a fixed center. The swivel mounting is provided according to this invention by a bracket 26 bolted by means of bolts such as 27 or otherwise secured to an inner face of the chassis beam 11 opposite the beam carrying the gear box 23. This bracket 26 has a horizontal bottom ledge 26a reinforced by means of side flanges 26b with the mounting wall or back 26c of the bracket. The ledge 26a has an aperture 28 therethrough receiving the threaded end 29a of a stud 29. The stud 29 includes a cylindrical portion 29b of larger diameter than the threaded end 29a and cooperating therewith to provide a shoulder 29c for bottoming on the ledge. The stud 29 has a frusto conical head 29d diverging from the cylindrical portion 29b thereof. A peripheral groove 30 is formed around the frusto conical head 29d of the stud near the large end of the head. A grease hole 31 extends transversely through the head 29d and communicates at its ends with the groove 30. A threaded bore 32 is formed in the end face of the head 29d to a depth communicating with the hole 31. A lubricant fitting 33 is threaded into this hole 32. Lubricant from the fitting 33 is conveyed by the cross hole 31 to the groove 30.

The idler arm 25 has an eye end 25a with a frusto conical bore or hole 25b therethrough. This hole 25b is sized to receive the head 29d of the stud 29 in bearing engagement therewith. The hole 29b is broached inwardly from the small end thereof to provide longitudinally extending grease grooves 34 at spaced intervals around the hole. These grooves do not extend to the large end of the hole but terminate at 34a in spaced relation from the bottom of the arms. The upper ends of the grooves communicate with the upper face 25c of the arm.

The arm has a peripheral upstanding flange 25d around the periphery of the eye end 25a thereof and extending upwardly from the top face 25c. A seal ring 35 composed of resiliently deformable lubricant resisting material such as synthetic rubber like "neoprene" is seated within the flange 25d on the top face 25c of the eye end 25a. This ring is in the form of a tubular sleeve segment and projects above the flange 25d into engagement with the underface of the ledge 26a of the bracket 26. A nut 36 is threaded on the threaded end 29a of the stud 29 and is bottomed on the ledge 26a to draw the stud shoulder 29c against the bottom face of the ledge 26a. This fixedly clamps the stud on the bracket 26 and draws the ring 35 into sealing engagement with the bottom face of the ledge 26a.

A coil spring 37 preferably of a tapered configuration has the large end coil 37a thereof bottomed on the face 25c of the arm 25 and has the small end coil 37b thereof snugly fitting around the stud portion 29b and engaging the underface of the ledge 26a. The end coil 37a is of a diameter sufficiently large to engage the seal 35. The spring 37 is loaded when the nut 36 draws the stud into clamped engagement with the ledge 26a. This loading of the spring causes it to urge the idler arm 25 downwardly for maintaining the head of the stud and the hole of the eye end of the arm in constant bearing engagement. At the same time the loading of the spring tends to expand the end coil 37a for urging the seal 35 into sealing engagement with the flange 25d.

Lubricant from the grease groove 30 flows into the grooves 34 and upwardly into a closed reservoir R provided between the ledge 26a and the top face 25c of the mounting bracket and arm respectively. This reservoir R is sealed by the seal 35. Grease will not flow out of the large bottom end of the swivel joint assembly because the grooves 34 stop at 34a and the spring 37 maintains good bearing contact between the large end of the stud head and the large end of the hole in the arm. This bearing contact prevents free outflow of grease. The reservoir R is adapted to retain a quantity of grease for feeding back through the grooves 34 to lubricate the wearing surfaces of the assembly. As a result the joint assembly of this invention has a storage reservoir for grease and need only be lubricated at widely spaced intervals of time.

In the event shock impacts cause the top face 25c of the arm to move toward the ledge 26a the reservoir R will momentarily be reduced in size and if this reservoir is loaded with lubricant this reduction will force flush lubricant back through the grooves 34.

A cotter pin 38 is passed through the threaded end 29a of the stud 29 into castellated portions of the nut 36 for locking the nut on the stud.

Figure 3:
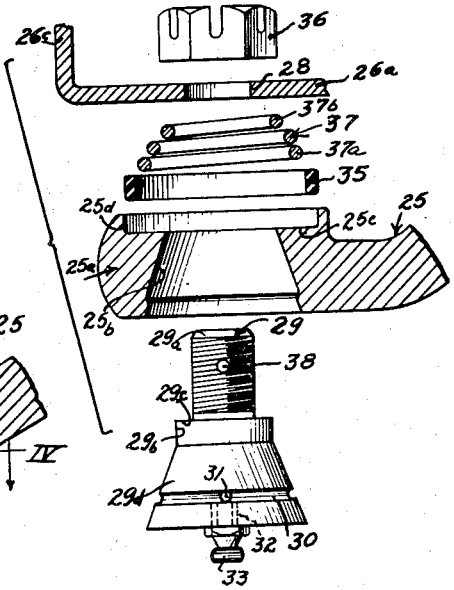
Figure 3 is a view similar to Fig. 2 but illustrating the parts in separated relation.

As shown in Fig. 3 of the drawings the idler arm is quickly mounted on the bracket 26 by assembling the parts in the order shown. Thus the stud is passed through the hole 34 in the eye end of the arm, the seal 35 is disposed within the flange 25d of the arm, the spring 37 is disposed around the stud and bottomed on the top face 25c of the arm and the threaded end 29a of the stud is passed through the hole 28 in the mounting flange. The single nut 36 then holds the entire assembly together.

From the above descriptions it will be understood that this invention provides a joint assembly which is readily mounted on a supporting bracket and cooperating with the supporting assembly to provide a grease reservoir to retain a supply of lubricant for lubricating the wearing surfaces of the joint. A spring is provided in this reservoir to hold the wearing surfaces in bearing engagement. A single nut holds the entire assembly in position. The joint is especially useful to provide a swivel mounting for the idler arm of a parallelogram type steering linkage.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a parallelogram type steering linkage for wheels including a pitman arm shifted cross link and an idler arm for swingably supporting the cross link, the improvement which comprises a swivel joint assembly for said idler arm including a mounting wall, a stud fixedly suspended from said mounting wall, an eye end on said idler arm receiving said stud, a relatively short axially loaded unbowed tubular seal ring between said wall member and said eye end of the idler arm and cooperating therewith to define a closed lubricant reservoir, a spring in said reservoir respectively bottomed on the wall member and eye end of the arm, a lubricant fitting on said stud, and passageways in said stud and eye end of the idler arm joining said lubricant fitting with the bearing surfaces of the stud and eye end of the arm respectively and with the sealed reservoir between the arm and wall.

2. A swivel mounting adapted for the idler arm of a parallelogram type steering linkage which comprises an arm member having an eye end with a tapered bore therethrough, said eye end having an end face at the small end of said bore, said end face having an upstanding peripheral flange, a seal ring within said flange and projecting thereabove, a wall member having a face engaging said seal ring, a stud having a shank affixed to said wall member and having a frusto conical head on an end of the shank forming the sole closure for the large end of the tapered bore, a spring compressed between the faces of the wall member and eye end of the arm and having an end coil urging the seal ring against said flange, a lubricant fitting threaded into the large end of the stud head, said stud head having a cross hole therethrough communicating with said lubricant fitting and having a peripheral groove therearound communicating with said cross hole, said tapered bore of the arm having a plurality of lubricant conveying passageways registering with the groove, said passageways terminating in spaced relation from the large end of the bore and extending through the small end thereof, said spring urging said faces of the wall and arm apart to provide therebetween a reservoir sealed by said ring for receiving grease from said passageways and said spring accommodating movement of said faces toward each other to force lubricant from the reservoir back into the passageways.

3. A swivel joint assembly adapted for the idler arm of a steering assembly which comprises a mounting bracket having an apertured mounting ledge, an arm having an eye end with an open-ended tapered hole therethrough under said ledge, a stud depending from said ledge and having a tapered head in bearing engagement in said tapered hole of the eye end of the arm and forming the sole closure for the large end of the tapered hole, a spring interposed between said ledge and said eye end of the arm urging the arm toward the large end of a stud head for maintaining the arm and stud head in good bearing engagement, and a seal interposed between said ledge and said eye end of the arm around said spring for cooperating with the ledge and arm to define a sealed lubricant reservoir adapted to supply lubricant to the bearing surfaces of the stud head and hole in the arm.

4. A bearing assembly comprising a bracket having a mounting ledge, a stud depending from said mounting ledge having a tapered head diverging from said ledge, a housing having a tapered hole swivelly mounted on said head of the stud, said housing having an end face spaced from said ledge, an upstanding annular flange on said end face of the housing, an unbowed tubular seal ring within said flange having one end sealingly engaging said ledge and the other end sealingly engaging said flange, a spring compressed between said ledge and said face of the housing, said spring engaging said seal ring to sealingly clamp the seal ring against said flange, a lubricant fitting on said stud head, and grease grooves connecting said lubricant fitting with the space between the ledge and end wall of the housing sealed by said seal ring whereby said sealed space is adapted to store lubricant for lubricating the wearing surfaces of the joint.

5. A joint assembly comprising a mounting member, an arm having an eye end defining an internal bearing surface, a stud extending from said mounting member having a head in bearing engagement on the bearing surface of said eye end, said eye end having a recessed portion on one face thereof defining a ledge therearound, an unbowed tubular seal ring seated in said recess, spring means between the shank of the stud and said seal ring urging the side walls of said ring into engagement with said ledge, and means for urging the end of said seal ring into sealing engagement with the bottom wall of the bracket.

MATTHEW P. GRAHAM.

REFERENCES CITED

The following references are of record in the file of this patent:

UNITED STATES PATENTS

| Number | Name | Date |
| --- | --- | --- |
| 422,914 | Casto | Mar. 11, 1890 |
| 1,856,325 | Flentje | May 3, 1932 |
| 1,967,288 | Cathcart | July 24, 1934 |
| 2,189,266 | Klages | Feb. 6, 1940 |
| 2,328,160 | Marvin | Aug. 31, 1943 |
| 2,397,464 | Booth | Apr. 12, 1946 |